Figure 1:
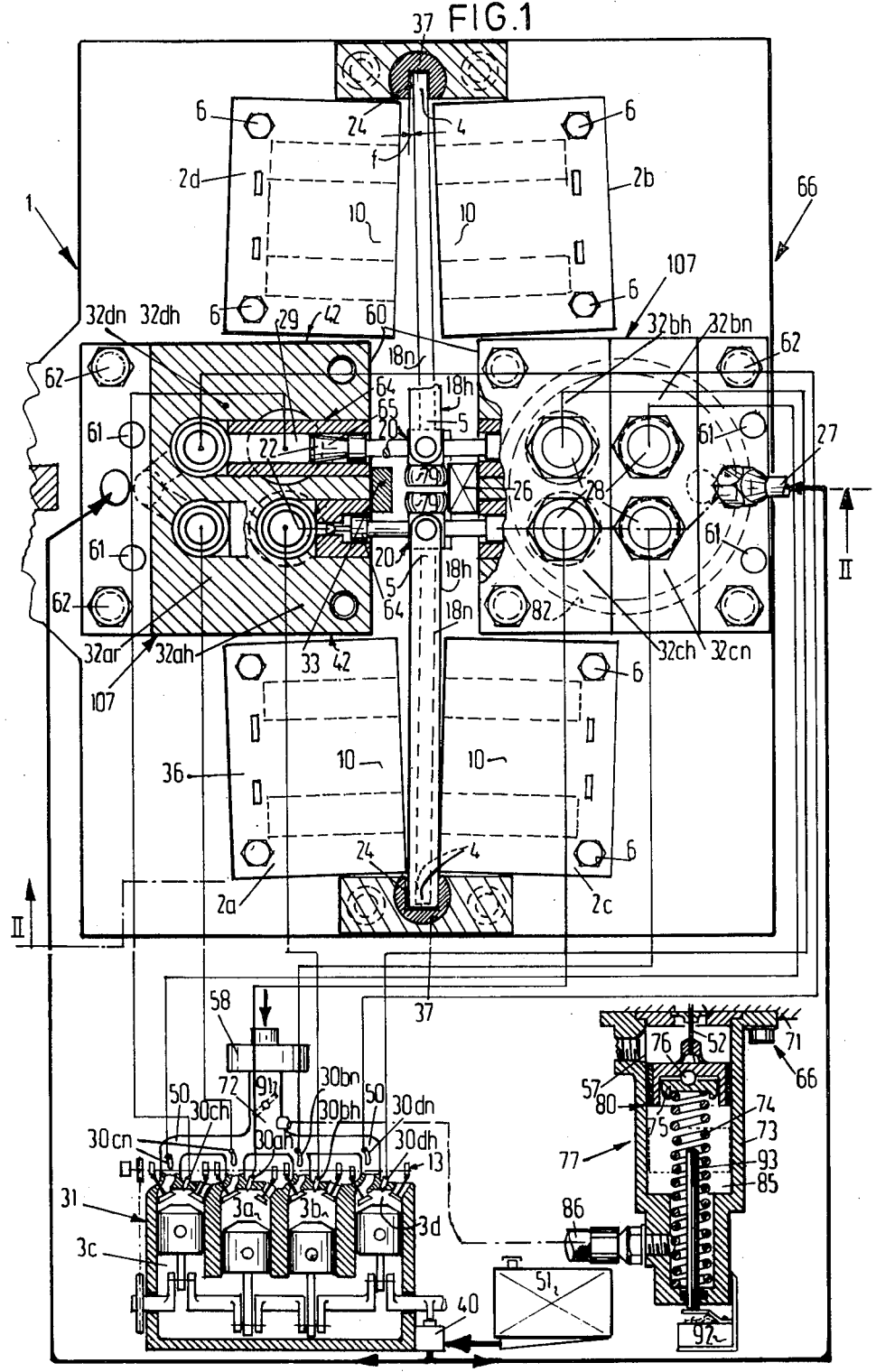

United States Patent [19]

Brinkman

[11] 4,080,949
[45] Mar. 28, 1978

[54] COMBUSTION ENGINE AND INJECTOR FOR A COMBUSTION ENGINE

[75] Inventor: Willem Brinkman, Velp, Netherlands

[73] Assignee: Holec N.V., Hengelo, Netherlands

[21] Appl. No.: 604,547

[22] Filed: Aug. 14, 1976

[30] Foreign Application Priority Data

Aug. 21, 1974 Netherlands ..................... 7411143

[51] Int. Cl.² .......................................... F02B 19/10
[52] U.S. Cl. ............................ 123/32 ST; 123/139 E; 417/410
[58] Field of Search .......... 123/32 AE, 139 E, 32 ST, 123/32 SP, 191 S; 92/13, 13.1, 13.5, 13.51, 13.7, 13.71; 417/410

[56] References Cited

U.S. PATENT DOCUMENTS

| 1,534,829 | 4/1925 | Behnke | 417/417 |
| 1,850,926 | 3/1932 | Feyens | 92/13 X |
| 2,148,112 | 2/1939 | Dillstrom | 92/13.1 X |
| 3,009,628 | 11/1961 | Kolfertz | 417/410 |
| 3,124,116 | 3/1964 | Morris | 123/139 R |
| 3,508,530 | 4/1970 | Clawson | 123/191 S |
| 3,784,334 | 1/1974 | Hilgert | 417/410 X |
| 3,924,598 | 12/1975 | Davis | 123/32 ST |
| 3,980,058 | 9/1976 | Nakagawa et al. | 123/32 ST X |
| 3,990,413 | 11/1976 | Pischinger | 417/499 X |

FOREIGN PATENT DOCUMENTS

| 936,842 | 7/1948 | France | 92/13.1 |
| 397,493 | 10/1932 | United Kingdom | 123/139 E |

Primary Examiner—Charles J. Myhre
Assistant Examiner—Tony M. Argenbright
Attorney, Agent, or Firm—Snyder, Brown & Ramik

[57] ABSTRACT

In order to improve the ignition of the fuel-air-mixture provided in the combustion cylinder at a low fuel expenditure the displacement member of a first fuel pump is coupled with an armature of an electro-magnet and at the same time an air supply conduit of the combustion engine is provided with a second atomizer supplying fuel to the air.

In this combustion engine the first atomizer may inject fuel in a finely divided condition in the vicinity of the spark-plug, so that the extra rich fuel-air-mixture can be ignited easily in the vicinity of the spark-plug as a result of which the combustion of the remaining, relatively poor fuel-air-mixture takes place.

15 Claims, 5 Drawing Figures

COMBUSTION ENGINE AND INJECTOR FOR A COMBUSTION ENGINE

The invention relates to a combustion engine, comprising a number of combustion cylinders each provided with at least one first atomizer injecting fuel in said cylinder and one injector having at least one first fuel pump for delivering fuel to each first atomizer, wherein the fuel chamber of each first fuel pump has a pump volume adjustable with control means, said pump chamber communicating through an inlet valve with a fuel supply and through a fuel outlet with a first atomizer and being limited by at least one displacer body having a stroke adjustable by means of control means.

The invention has for its object to improve the ignition of the fuel-air-mixture provided in the combustion cylinder at a low fuel expenditure. To this end and in accordance with the invention the displacer body of the first fuel pump is coupled with at least one armature of at least one electro-magnet and at the same time at least one air supply conduit of the combustion engine is provided with a second atomizer supplying fuel to the air.

In this combustion engine the first atomizer may inject fuel in a finely divided condition in the vicinity of the spark-plug, so that the extra rich fuel-air-mixture can be ignited easily in the vicinity of the spark-plug as a result of which the combustion of the remaining, relatively poor fuel-air-mixture takes place.

Preferably each combustion cylinder is provided with said first atomizer injecting fuel therein as well as with a second atomizer injecting fuel at the outside thereof. Then the division of the fuel along each combustion cylinder is better controlled.

The invention also provides an injector for delivering fuel to a combustion engine, wherein the pump chamber of at least one fuel pump having a volume adjustable with control means communicates through an inlet valve with a fuel supply, is limited by at least one displacer body and has a fuel outlet for connection to a first atomizer injecting fuel into a combustion cylinder. Said injector is improved in accordance with the invention in that the displacer body is coupled with the armature of an electro-magnet and the injector at least comprises a second fuel pump having a fuel outlet for connection to a second atomizer injecting fuel outside of said combustion cylinder.

Preferably each first fuel pump has a smaller pump volume than each second fuel pump.

Then the first fuel pump may easily inject fuel at a considerably higher pressure than the second fuel pump.

A simple injector is obtained when one pair of electro-magnets energizes the armature of at least one first fuel pump and the armature of at least one second fuel pump.

In order to make the stroke of the armature of the first fuel pump smaller than the stroke of the armature of the second fuel pump, said armatures are preferably separated from each other.

The aforesaid and further features of the invention will be set out hereinafter with reference to a drawing.

In the drawing

Figure 2:
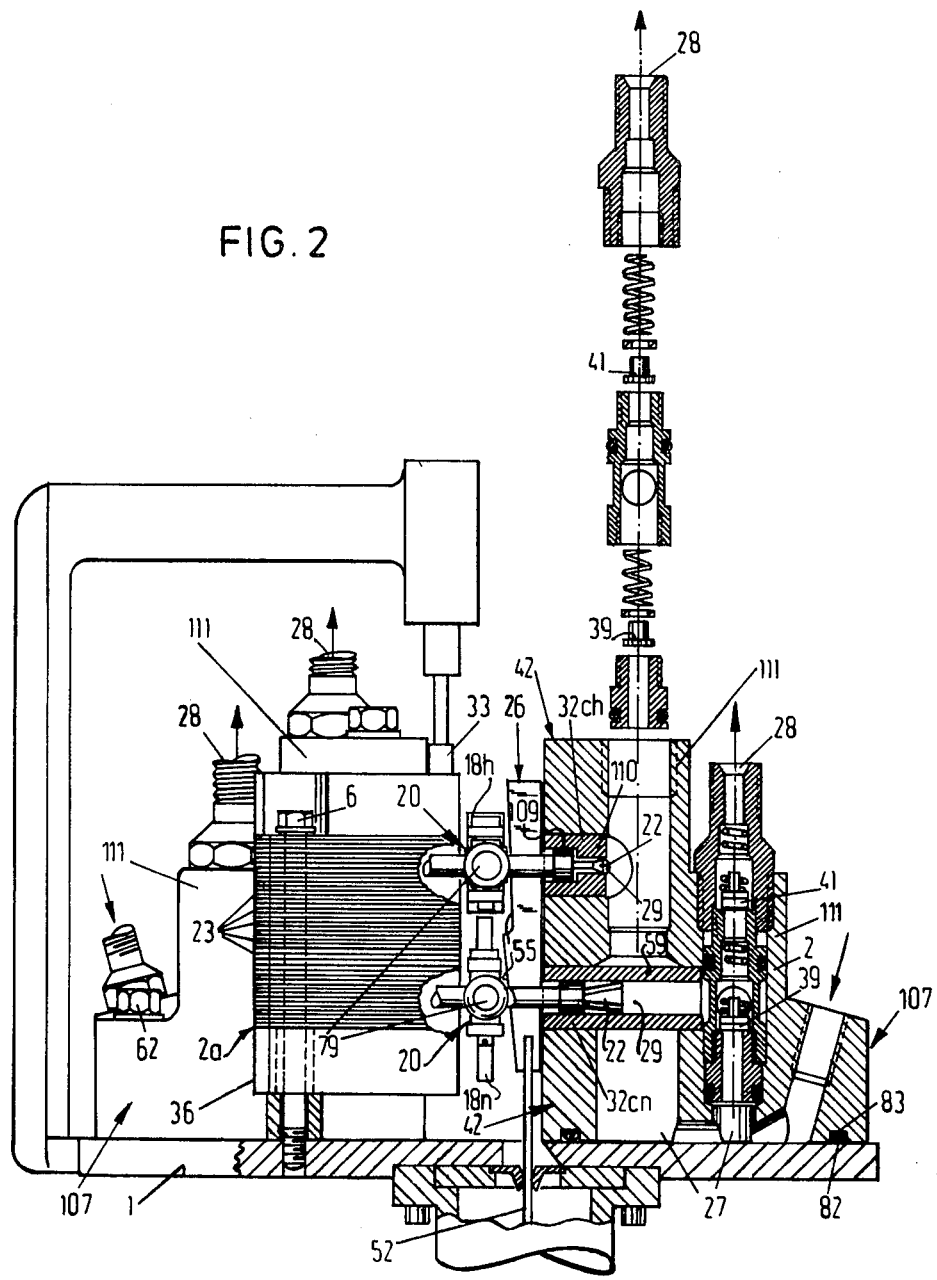
Figure 3:
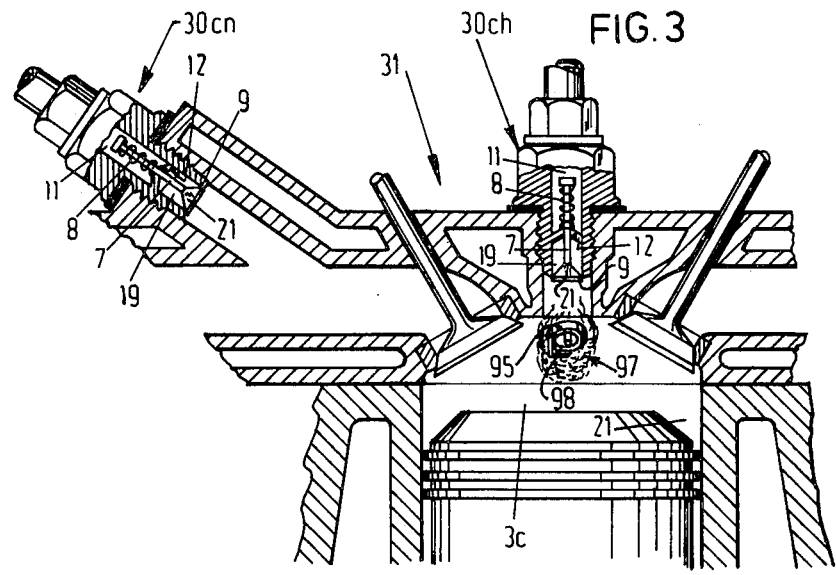
Figure 4:
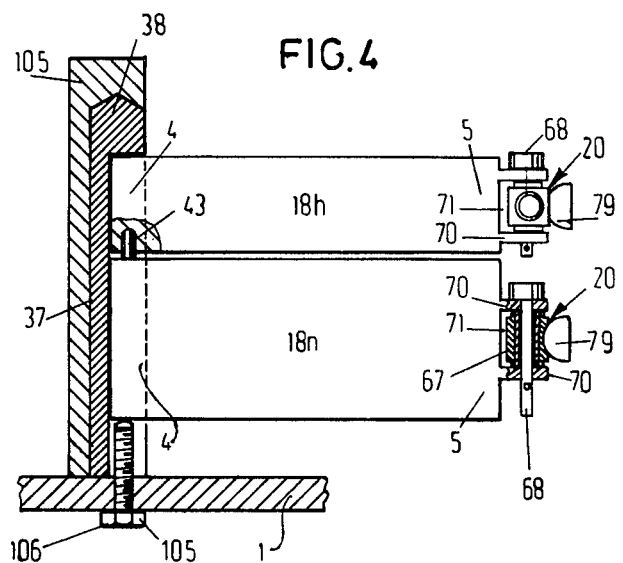
Figure 5:
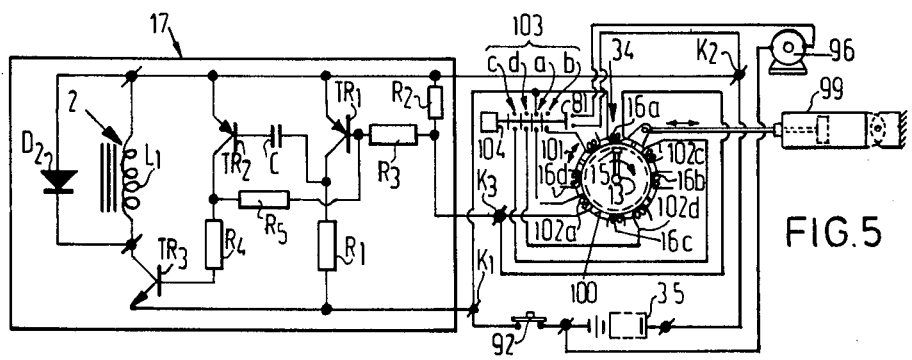

FIG. 1 is a plan view partly broken away of a preferred embodiment of an injector according to the invention, showing schematically the connection with a combustion engine, FIG. 2 is a sectional view taken on the line II-II in FIG. 1, FIG. 3 is a sectional view on an enlarged scale taken through a detail III in FIG. 1, FIG. 4 is a sectional view taken on the line IV—IV in FIG. 1, and FIG. 5 is a diagram of an electronic circuitry for the energization of electro-magnets.

Two pairs of electro-magnets $2a$ and $2c$, $2b$ and $2d$ respectively are rigidly secured by means of bolts 6 to a mounting plate 1 forming the frame of the injector 66. Each of the electro-magnets $2a$, $2b$, $2c$ and $2d$ comprises a core 10 formed by a stack of magnet plates 23 and an energizing coil 14 surrounding said core 10. The bolts 6 engage the magnet plates 23. Each electro-magnet $2a$, $2b$, $2c$ and $2d$ is embedded in a block of synthetic resin 36. Two sheet-like armatures $18h$ and $18n$ are pivotally arranged between each pair of alternately energized electro-magnets $2a$, $2c$ and $2b$, $2d$ respectively (see FIG. 4). Each armature $18h$ and $18n$ is pivoted by one rectangular end 4 to a bearing 37 of wear-tight, relatively hard, elastic material, e.g. rilsan or arnite, said bearing 37 being embedded in a metal bearing block 105 mounted by means of screws 106 to the mounting plate 1. Each end 4 is provided with a space $f$ of 0.05 mm in a slot 24 of the bearing 37, so that when energizing an electro-magnet $2a$, $2b$, $2c$ or $2d$ the respective armatures $18h$ and $18n$ move at the same time first along the remaining space $f$ to the electro-magnets energized, then the armatures $18h$ and $18n$ press the elastic material of the bearing 37 somewhat and if necessary the armatures $18h$ and $18n$ pivot at last about their end 4 which lies against a side of the slot.

The ends 4 of the armatures $18h$ and $18n$ are shut up in a vertical direction, in that the bearing 37 is locked up by a conical upper end 38 in the bearing block 105, in that a pin 43 embodied in the armature $18h$ abuts against the upper side of the armature $18n$ and in that a screw 106 screwed into the mounting plate 1 is screwed against the lower side of the armature $18n$.

At its free end 5 each armature $18h$ holds a coupling member 20, with which are connected two displacer bodies 22 of two first fuel pumps $32ah$ and $32ch$, $32bh$ and $32dh$ respectively. Each armature $18n$ holds at its free end 5 a coupling member 20 with which are connected two displacer bodies 22 of two second fuel pumps $32an$ and $32cn$, $32bn$ and $32dn$ respectively. The stroke of the displacer bodies 22 is determined by adjustable controlmeans arranged on each side of the coupling members 20 formed by two wedges 26 and 33.

Each of said fuel pumps comprises a pump housing 42 having a pump chamber 29 bounded by an inlet valve 39 and an outlet valve 41, a fuel inlet 27 to be connected with a fuel tank 51 through a fuel supply pump 40 and a fuel outlet duct 28. The pump housings 42 of the fuel pumps $32bh$, $32bn$, $32ch$ and $32cn$ constitute together a stiff and compact housing block 107 as well as the pump housings 42 of the fuel pumps $32ah$, $32an$, $32dh$ and $32dn$ do so. The pump housings 42 are arranged pairwise coaxially opposite one another and at a distance $h$ from each other by means of connecting means. These connecting means are formed by fitting pins 61 and bolts 62, which rigidly secure the housing blocks 107 with the base plate 1. Annular grooves 83 are arranged in the lower side of the housing blocks 107, while rubber O-rings 82 are provided in said grooves 83 for sealing the housing blocks 107 with respect to the base plate 1. The front surfaces 60 of the pump housings 42 are held in accurate parallel positions to one another by the fitting pins 61.

The displacer bodies 22 are each made of a synethetic resin, preferably a superpolyamide, and comprise each a cup-shaped piston 63 and a shaft 65 which is attached with the insertion of glue into a hard-steel coupling member 20 comprising a guide collar 64 engaging the pump chamber 29.

FIG. 1 illustrates an engine operating with a firing order of 1-3-4-2. The first fuel pumps 32ah, 32bh, 32ch and 32dh are connected to the respective injectors 30bh, 30dh, 30ah and 30ch which provide direct injection into the cylinders. The injection timing is at about 50°-30° before top dead center during the compression strokes of the cylinders, with ignition timing in the range 30°-20° BTDC. The injection volumes vary within the range of 1-5mm$^3$ and the injection is at a pressure of about 35 atmospheres. The second pumps 32an, 32 bn, 32cn and 32dn are connected to the intake manifold injectors 30an, 30cn, 30bn and 30dn respectively. Thus, as #1 cylinder is receiving direct injection during the latter part of its compression stroke, cylinder #4 is receiving indirect injection into its intake manifold branch 50 during the latter part of its exhaust stroke, and so on for other similarly paired cylinders in the firing sequence. Thus, each pump pair such as 32ah, 32an provides direct injection to one cylinder at about 50°-30° before top dead center for that cylinder while providing indirect injection to another cylinder at about 50°-30° before bottom dead center for that cylinder, during the respective compression and exhaust strokes of the cylinders involved. The second injectors operate at low pressure, i.e., 5 atmospheres, and inject relatively large quantities of fuel ranging, for example, from 6-40 mm$^3$ per stroke. For engines having a crankshaft configuration requiring the firing order 1-4-3-2, the pumps will require different connections. For example, the pumps 32ah, 32bh, 32ch and 32dh would be connected to the injectors 30dh, 30bh, 30ah and 30ch while the pumps 32an, 32bn, 32ch and 32dn would be connected to the injectors 30cn, 30an, 30bn and 30dn. A second fuel pump for low pressure is provided beneath each first fuel pump for high pressure. This will be clarified in FIG. 2 with reference to the fuel pumps 32ch and 32cn. The fuel pump 32ch has a particularly small pump volume. In order to control the output yet accurately a particularly small diameter of the pump cylinder 110 is used so that for obtaining an output of e.g. 1 m$^3$ with a diameter of 2 mms the stroke amounts about 0.3 mms. As the conduction of the displacer body 22 can be hardly realised with a small diameter the displacer body 22 is guided through a guide collar 64 into a cylindrical room 108 having a larger diameter of for instance 6 mms, said guide collar 64 being provided with an axial groove 109 for the escape of air. The fuel pump 32cn comprises a pump cylinder 59 having a larger diameter of for instance 6 mms, in which cylinder also a guide collar 64 is guided. The outer diameter of the pump cylinder 59 is smaller than the diameter of the fuel inlet 27, through which the pump cylinder 59 transversely extends. The valve housing 111 of the fuel pump 32ch is provided above the pump cylinder 59 of the fuel pump 32cn, said valve housing 111 comprising the inlet valve 39 and the outlet valve 41 with their accompanying parts which are represented in an exploded view. Behind the aforesaid parts and at a somewhat lower level the valve housing 111 of the fuel pump 32cn is provided having to this end an extra long pump cylinder 59.

The displacer bodies 22 of each pair of fuel pumps 32ah and 32ch; 32bh and 32dh; 32an and 32cn; and 32bn and 32dn respectively are coupled with one another by means of a coupling member 20. Each coupling member 20 is coupled with the respective armature 18h or 18n through an elastic ring 67 gripping around a pin 68 of an armature 18h or 18n.

The displacer volume of each fuel pump 32ah and 32ch; 32bh and 32dh; 32an and 32cn and 32bn and 32dn respectively is determined by the stroke of a coupling member 20 which is adapted to reciprocate by convex stop surfaces 49 of a stop member 79 between the wedges 26 and 33. In order to maintain the accurate adjustment of said stroke the stop member 79 as well as the wedges 26 and 33 are made of hard steel, whilst said wedges bear on hard steel cylinders 59 and 110 pressed into the pump housing 42. At each stroke the coupling member 20 abuts against a hard stop, whereas the mass of the armatures 18h and 18n moves on over a small distance and is resiliently stopped by the ring 67.

Between the two housing blocks 107 wedges 26 and 33 are disposed to serve as common control means for each of said eight fuel pumps. The distance $t$ between the coupling members 20 is small so that fluctuations of the pump yield due to mounting errors are small.

Each atomizer 30ah, 30bh, 30ch, 30dh, 30an, 30bn, 30cn and 30dn comprises a needle 7, a conical end 21 of which is tightly drawn by a strong spring 8 to the seat 9. At a high pressure of fuel in a chamber 11 communicating with the fuel duct 28 and a chamber 19 communicating with the former through a perforated collar 12 said end 21 is urged away from the seat 9 against the action of the spring 8 (see FIG. 3).

Each electro-magnet 2a, 2b, 2c and 2d is controlled by a circuitry 17 shown schematically in FIG. 5. The transistors $TR_1$ and $TR_2$ in conjunction with the associated resistors $R_1$, $R_2$, $R_3$, $R_4$ and $R_5$ and the capacitor C constitute a monostable multivibrator. The resistor $R_1$ and the capacitor C determine the time constant. The collector output of the transistor $TR_2$ forms via the resistor $R_4$ the input of the transistor $TR_3$, which serves as an amplifier for the current to be passed through the coil $L_1$ of the electro-magnet 2a, 2b, 2c or 2d. Across the coil $L_1$ is connected a quenching diode $D_1$. To the input terminals $K_1$ and $K_2$ is connected a supply source 35 and the input $K_3$ serves for the application of a control-pulse originating from a pulse generator 34. The pulse generator 34 may be coupled, for example, with a cam shaft 13 of the combustion engine 31 and comprises a rotatable permanent magnet 15, which passes alternately by one of the four coils 16a, 16b, 16c and 16d for sequentially energizing the electro-magnets 2a, 2b, 2c and 2d respectively. Each of said four coils 16a, 16b, 16c and 16d is disposed between the input terminals $K_3$ and $K_1$ of an associated circuit 17. In this way the atomizers inject the fuel required for each combustion cylinder during each cycle of the combustion engine 31 at the required instants. The order of succession of energization of the electro-magnets 2a, 2b, 2c and 2d is chosen so that each of the wedges 26 and 33 is just released from a coupling member 20 in each cycle so that each of them can be adjusted individually by a slight adjusting force.

FIG. 1 shows a cylinder 73 having a piston 80 for driving the wedge 26. A measuring chamber 85 of the cylinder 73 communicates constantly via a duct 86 with the air inlet manifold 72 of the combustion engine 31 connected via a throttle valve 91 with an air filter 58.

A reset spring 74 centrally engages the piston 80 through a cup spring 75 and a ball 76. The wedge 33 is displaced, independently of the wedge 26, under the action of other factors, for example, atmospheric pressure by means of a control-member 77. The piston 80 is coupled by means of a leaf spring 52 with the wedge 26.

The cylinder 73 has fastened to it an electric switch 92, which is actuated by way of a bar 93 by the cup spring 75 of the piston 80, when the pressure in the inlet manifold 72 drops below a given pressure of, for example, 200 mms Hg absolute value. The tension of the spring 74 and the switching position of the piston 80, shown by broken lines in FIG. 1, are chosen accordingly. The given pressure is comprised between the values of about 250 and 150 mms Hg produced in the inlet manifold 72 in an idle run (stationary run). In the switching position of the piston 80 the wedge 26 is in the minimum state, in which the fuel pumps 32ah, 32bh, 32ch, 33dh, 32an, 32bn, 32cn and 32dn yield the minimum quantity of fuel required for perfect combustion. Upon deceleration the pressure in the inlet manifold 72 drops below said given value. Then the quantity of air entering the combustion cylinders 3a, 3b, 3c and 3d is too small for ensuring perfect combustion. As soon as after deceleration a sufficient quantity of air is available in the inlet manifold 72 for ensuring satisfactory combustion, the required minimum quantity is given off. In this situation the combustion engine 31 supplies only little power and thus gradually gains in force, which is to be preferred over an abrupt start. The switch 92 is connected between the accumulator 35 and the terminal $K_1$, so that, when the switch 92 is open, no control-pulses are supplied.

As is illustrated in FIG. 5 each first atomizer 30ah, 30bh, 30ch and 30dh injects directly into a cylinder 3a, 3b, 3c and 3d respectively and preferably in such a direction and at such an instant of the engine cycle that at the instant of ignition the spark gap 98 of a spark plug 95 is surrounded by a cloud 97 of finely atomized fuel, whereas at areas remote from the spark gap 98 the mixture has a poor fuel content. This heterogeneous distribution of fuel in the combustion cylinder is highly conducive to ignition. Owing to the use of the electro-magnetic drive of the displacer body 22 the fuel can be finely atomized at a pressure of 35 ato, about 10 ato, for example, serving to overcome the compression pressure and the remainder for carrying out the fine atomization. The force exerted on the armature 18h by an electromagnet 2a, 2b, 2c or 2d strongly increases according as the armature 18h approaches this energized magnet. Thus the armature 18h and hence the displacer body 22 of the fuel pump 32ah, 32bh, 32ch, 32dh respectively is accelerated even at the end of the pump stroke so that even with an opened atomizer 30 the fuel to be atomized maintains a great pressure difference across the atomizer opening, which ensures a fine atomization. Therefore, an atomizing pressure of 20 ato at a compression pressure of 12 ato is amply sufficient. The magnetic force exerted on each armature 18h can be enhanced by taking care of the fact that each armature 18h is provided as close as possible at the electro-magnets. To this end the thickness $S_h$ of the armature 18h is greater than the thickness $S_n$ of the armature 18n, said last armature 18n requires owing to a somewhat larger pump stroke a larger free swing space.

By applying the electro-magnetic drive the instant of injection can be readily changed for matching the conditions varying in the course of operation or for matching a particular combustion engine 31.

The identical change of the instant of injection with respect to the instant of sparking of all combustion cylinders 3a, 3b, 3c and 3d is carried out by means of a speed-, torque- and/or temperature-sensitive regulator 99, which shifts an annular support 100 of the coils 16a, 16b, 16c and 16d in the direction of arrows 101 (see FIG. 5).

The support 100 holds, in addition, a set of coils 102a, 102b, 102c and 102d connected each by contacts 103a, 103b, 103c and 103d respectively of a switch 103 between the inputs $K_1$ and $K_3$. The switch 103 is switched on at a low number of revolutions of the combustion engine 31 by a control-member 104, which may be the starting knob of the combustion engine 31 and which actuates simultaneously a switch 81 for switching on the electric starting motor 96. In this way during the start every electro-magnet 2 is energized twice and afterwards only once per engine cycle. During the start twice the maximum yield of each fuel pump is provided.

Various modifications of the above described and illustrated embodiment are possible. It is imaginable, for example, that the first fuel pumps 32ah, 32bh, 32ch and 32dh are supplied with another fuel which can be more easily ignited than the second fuel pumps 32an, 32bn, 32cn and 32dn. Then the first fuel pumps are of course connected to a fuel supply which is separated from the fuel supply of the second fuel pumps.

What I claim is:

1. In combination with a combustion engine having at least one combustion cylinder provided with ignition means for igniting fuel/air mixture in said cylinder in timed relation to operation of the engine, and including an air intake conduit for said cylinder;

first atomizer means for discharging fuel into said cylinder in the vicinity of said ignition means;

second atomizer means for discharging fuel into said air intake conduit;

first pump means connected to said first atomizer means for delivering discrete shots of fuel to said first atomizer means at a high pressure sufficient to overcome the internal pressure of said cylinder during the last half of the engine compression cycle for said cylinder whereby a fuel rich environment is present in the vicinity of said ignition means at the time of ignition, and drive means for actuating said first pump means comprising an armature and an electromagnet for attracting said armature to pump fuel and means for energizing said electromagnet for fixed time durations independent of the rotational speed of the engine;

second fuel pump means connected to said second atomizer means for intermittently delivering discrete shots of fuel to said second atomizer means at times other than those in which said first pump means is actuated and at a pressure lower than said high pressure and in amounts to provide lean fuel-/air mixture to said cylinder; and control means for controlling the volumes of said discrete shots of fuel delivered to said first and second atomizer means.

2. In the combination as defined in claim 1 wherein said second pump means comprises an armature and an electromagnet for attracting said armature to pump fuel.

3. In combination with an internal combustion engine having at least two cylinders each provided with an air intake conduit and each provided with ignition means for igniting fuel/air mixture in the respective cylinders in timed relation to operation of the engine;
- a first high pressure atomizer means for discharging fuel to one of said cylinders in the vicinity of said ignition means thereof and a second high pressure atomizer means for discharging fuel to the other of said cylinders in the vicinity of said ignition means thereof;
- a first pressure atomizer means for discharging fuel into the air intake conduit of said one cylinder and a second low pressure atomizer means for discharging fuel into the air intake conduit of said other cylinder;
- first pump means for delivering discrete shots of fuel essentially simultaneously to said first high pressure atomizer means and to said second low pressure atomizer means respectively near the end of the compression cycle of said one cylinder and near the end of the exhaust cycle of said other cylinder;
- second pump means for delivering discrete shots of fuel essentially simultaneously to said second high pressure atomizer means and to said first low pressure atomizer means respectively near the end of the exhaust cycle of said one cylinder and near the end of the compression cycle of said other cylinder; and
- control means associated with said first and second pump means for controlling the volumes of said discrete shots in accord with engine load and so that each high pressure atomizer means provides a fuel rich environment in the vicinity of its associated ignition means while each low pressure atomizer means produces a lean fuel/air mixture in its associated air intake conduit.

4. In the combination as defined in claim 3 wherein each pump means comprises a pair of armatures, a displacer body connected to one armature of said pair for delivering fuel to an associated high pressure atomizer means, a second displacer body connected to the other armature of said pair for delivering fuel to an associated low pressure atomizer means, and electromagnetic means for simultaneously attracting said pair of armatures to pump fuel.

5. An injector system for internal combustion engines, comprising in combination:
- high pressure atomizer means for discharging fuel directly to a cylinder of an internal combustion engine;
- low pressure atomizer means for discharging fuel indirectly to such cylinder of an internal combustion engine;
- first pump means for delivering discrete shots of fuel to said high pressure atomizer means, said first pump means including a displacer body, a first armature connected to said displacer body, and electromagnetic means for attracting said armature to pump fuel at a high pressure to said high pressure atomizer means;
- second pump means for delivering discrete shots of fuel at low pressure to said low pressure atomizer means;
- control means for controlling the volumes of said discrete shots of fuel in accord with engine load; and
- a second high pressure atomizer means and a second low pressure atomizer means respectively adapted to discharge fuel directly to a further cylinder of the engine and indirectly to such further cylinder;
- said first pump means comprising a second displacer body and a second armature connected to said second displacer body, said electromagnetic means of the first pump means simultaneously attracting said first and second armatures to pump fuel to said high pressure atomizer means first mentioned and to said second low pressure atomizer means, and said second pump means delivering fuel to both said low pressure atomizer means first mentioned and to said second high pressure atomizer means.

6. An injector system as defined in claim 5 wherein said second pump means comprises a pair of armatures, a pair of displacer bodies respectively connected to said pair of armatures, and electromagnetic means for simultaneously attracting said pair of armatures to pump fuel.

7. In an internal combustion engine including a pair of cylinders operating 360° out of phase such that as one cylinder experiences compression the other cylinder experiences exhaust, each cylinder having an ignition device and each also having an air intake conduit, the combination of:
- a pair of high pressure atomizers, one associated with each of said cylinders to discharge a fine spray of fuel in the vicinity of the associated ignition device;
- a pair of low pressure atomizers, one associated with each of said air intake conduits to discharge a spray of fuel into the associated air intake conduit to establish a fuel/air mixture therein;
- first pump means for delivering discrete shots of fuel substantially simultaneously to one of said high pressure atomizers and to one of said low pressure atomizers in timed relation to operation of said engine whereby said one high pressure atomizer discharges fuel into one cylinder during its compression stroke while said one low pressure atomizer discharges fuel into the air intake of the other cylinder during its exhaust stroke;
- second pump means for delivering discrete shots of fuel substantially simultaneously to the other of said high pressure atomizers and to the other of said low pressure atomizers in timed relation to operation of said engine whereby said other high pressure atomizer discharges fuel into said other cylinder during its compression stroke while said other low pressure atomizer discharges fuel into the air intake conduit of said one cylinder during its exhaust stroke; and
- control means for regulating the quantities of fuel delivered by said first and second pump means.

8. In the combination as defined in claim 7 wherein said first and second pump means deliver discrete shots of fuel to said high pressure atomizers which are of smaller quantities then those discrete shots delivered to said low pressure atomizers.

9. In the combination as defined in claim 8 wherein said first and second pump means deliver fuel to said high pressure atomizers at a higher pressure than that delivered to said low pressure atomizers.

10. In the combination as defined in claim 9 wherein each pump means comprises a pair of displacer bodies associated respectively with a high pressure atomizer and a low pressure atomizer, a pair of armatures connected respectively to said pair of displacer bodies, and electromagnetic means for simultaneously attracting said pair of armatures to deliver said discrete shots of fuel.

11. In a fuel injection system, the combination of:

first pump means for delivering discrete shots of fuel at high pressure and low volume, said first pump means comprising a pump chamber, an inlet valve for introducing fuel into said chamber, an outlet valve for allowing fuel to escape from said chamber, a displacer body which is movable to vary the volume of said chamber, an armature connected to said displacer body to impart movement thereto, and electromagnetic means for periodically attracting said armature to pump said discrete shots of fuel at high pressure;

second pump means for delivering discrete shots of fuel at low pressure and high volume, said second pump means comprising a second pump chamber, a second inlet valve for introducing fuel into said second chamber, a second outlet valve for allowing fuel to escape from said second chamber, a second displacer body which is movable to vary the volume of said second chamber, a second armature connected to said second displacer body to impart movement thereto, and electromagnetic means for periodically attracting said second armature to pump said discrete shots of fuel at low pressure;

first atomizer means connected to the chamber of said first pump means through said outlet valve thereof for effecting direct injection into one cylinder of an internal combustion engine;

second atomizer means connected to the chamber of said second pump means through said second outlet valve for effecting indirect injection to another cylinder of an internal combustion engine; and control means for regulating the stroke of said displacer bodies whereby said first and second pump means deliver and discrete shots of low and high volume.

12. In a fuel injection system, the combination of:

first pump means for delivering discrete shots of fuel at high pressure and low volume, said first pump means comprising a pump chamber, an inlet valve for introducing fuel into said chamber, an outlet valve for allowing fuel to escape from said chamber, a displacer body which is movable to vary the volume of said chamber, an armature connected to said displacer body to impart movement thereto, and electromagnetic means for periodically attracting said armature to pump said discrete shots of fuel at high pressure;

second pump means for delivering discrete shots of fuel at low pressure and high volume, said second pump means comprising a second pump chamber, a second inlet valve for introducing fuel into said second chamber, a second outlet valve for allowing fuel to escape from said second chamber, a second displacer body which is movable to vary the volume of said second chamber, a second armature connected to said second displacer body to impart movement thereto, and electromagnetic means for periodically attracting said second armature to pump said discrete shots of fuel at low pressure;

first atomizer means connected to the chamber of said first pump means through said outlet valve thereof for effecting direct injection into one cylinder of air internal combustion engine;

second atomizer means connected to the chamber of said second pump means through said second outlet valve for effecting indirect injection to another cylinder of an internal combustion engine; and control means for regulating the stroke of said displacer bodies whereby said first and second pump means deliver said discrete shots of low and high volume;

the electromagnetic means of said first and second pump means being a common assembly simultaneously attracting both armatures.

13. In the fuel injection system as defined in claim 12 wherein each armature is pivoted at one end and is connected at its opposite end to a respective displacer body, said electromagnetic means exerting an attracting force on each armature between said ends thereof.

14. In an injector system for internal combustion engines comprising, the combination of:

first pump means for simultaneously delivering a first discrete shot of fuel directly into a first cylinder of an internal combustion engine and a second discrete shot of fuel into the intake of a second cylinder of the engine;

second pump means for simultaneously delivering a third discrete shot of fuel directly into said second cylinder of the engine and a fourth discrete shot of fuel into the intake of said first cylinder of the engine;

said first and second cylinders being 360° out of phase such that when the first cylinder is subjected to its compression cycle the second cylinder is subjected to its exhaust cycle and vice versa;

means for actuating said first pump means such that said first discrete shot of fuel is delivered during the latter part of the compression cycle of the first cylinder and the second discrete shot of fuel is delivered during the latter part of the exhaust cycle of the second cylinder;

means for actuating said second pump means such that said third discrete shot of fuel is delivered during the latter part of the compression cycle of said second cylinder and the fourth discrete shot of fuel is delivered during the latter part of the exhaust cycle of said first cylinder; and control means for regulating the quantities of fuel delivered in said discrete shots thereof.

15. In an injector system as defined in claim 14 wherein each said first and second pump means comprises a pair of armatures and a pair of electromagnets on opposite sides of said armatures, a high pressure piston actuated by one of said armatures for delivering that discrete shot of fuel which is delivered directly into a cylinder, and a low pressure piston actuated by the other of said armatures for delivering that discrete shot of fuel delivered into the intake of a cylinder, said means for actuating being operative to energize said electromagnets in sequential fashion.

* * * * *

UNITED STATES PATENT AND TRADEMARK OFFICE
CERTIFICATE OF CORRECTION

PATENT NO. : 4,080,949

DATED : March 28, 1978

INVENTOR(S) : Willem Brinkman

It is certified that error appears in the above-identified patent and that said Letters Patent are hereby corrected as shown below:

On the title page should read
-- [22] Filed: Aug. 14, 1975 --.

Signed and Sealed this

Eighteenth Day of July 1978

[SEAL]

Attest:

RUTH C. MASON
*Attesting Officer*

DONALD W. BANNER
*Commissioner of Patents and Trademarks*

UNITED STATES PATENT AND TRADEMARK OFFICE
CERTIFICATE OF CORRECTION

PATENT NO. : 4,080,949

DATED : Mar. 28, 1978

INVENTOR(S) : Willem Brinkman

It is certified that error appears in the above-identified patent and that said Letters Patent are hereby corrected as shown below:

Column 7, lone 10, after "first" insert ---low---.

Column 9, line 36, change "and" (first occurrence) to ---said---.

Signed and Sealed this

Twenty-second Day of August 1978

[SEAL]

Attest:

RUTH C. MASON
Attesting Officer

DONALD W. BANNER
Commissioner of Patents and Trademarks